(12) United States Patent
Amini

(10) Patent No.: US 6,392,421 B1
(45) Date of Patent: May 21, 2002

(54) SPECTRAL EM FREQUENCY METALLIC THICKNESS MEASUREMENT USING METALLIC TRANSPARENCIES

(75) Inventor: Bijan K. Amini, Houston, TX (US)

(73) Assignee: Em-Tech LLC, Houston, TX (US)

( * ) Notice: Subject to any disclaimer, the term of this patent is extended or adjusted under 35 U.S.C. 154(b) by 0 days.

(21) Appl. No.: 09/716,753

(22) Filed: Nov. 20, 2000

Related U.S. Application Data

(63) Continuation-in-part of application No. 09/332,202, filed on Jun. 12, 1999.
(60) Provisional application No. 60/088,955, filed on Jun. 11, 1998, provisional application No. 60/166,696, filed on Nov. 20, 1999, provisional application No. 60/166,693, filed on Nov. 20, 1999, and provisional application No. 60/166,695, filed on Nov. 20, 1999.

(51) Int. Cl.$^7$ ................................................ G01R 27/04
(52) U.S. Cl. ........................ 324/639; 324/229; 324/232
(58) Field of Search ................................. 324/639, 339, 324/368, 321, 229, 232, 233, 239; 118/689; 73/86

(56) References Cited

U.S. PATENT DOCUMENTS

| | | | |
|---|---|---|---|
| 3,574,458 A | 4/1971 | Hollis | |
| 3,617,779 A | * 11/1971 | Rosenberg | .................. 327/514 |
| 3,851,236 A | 11/1974 | Dennhardt | |
| 3,995,835 A | 12/1976 | Clichy | |
| 4,679,936 A | 7/1987 | Gerharz | |
| 5,038,107 A | 8/1991 | Gianzero | |
| 5,132,623 A | 7/1992 | De | |
| 5,150,446 A | 9/1992 | Penner | |
| 5,260,661 A | 11/1993 | Vail | |
| 5,283,520 A | 2/1994 | Martin | |
| 5,426,367 A | * 6/1995 | Martin | ........................ 324/339 |
| 5,610,517 A | 3/1997 | Ma | |
| 5,633,182 A | 5/1997 | Miyawaki | |
| 5,654,639 A | 8/1997 | Locatelli | |
| 5,698,977 A | 12/1997 | Simpson | |
| 5,751,144 A | 5/1998 | Weischedel | |
| 5,942,894 A | 8/1999 | Wincheski | |
| 5,969,254 A | 10/1999 | Yamaguchi | |
| 6,008,657 A | 12/1999 | Suyama | |
| 6,025,721 A | 2/2000 | Vail | |
| 6,084,403 A | 7/2000 | Sinclair | |
| 6,097,532 A | * 8/2000 | Harris | ........................ 356/326 |
| 6,100,696 A | 8/2000 | Sinclair | |
| 6,157,195 A | 12/2000 | Vail | |
| 6,291,992 B1 | 9/2001 | van Andel | |
| 2001/0015645 A1 | 8/2001 | Goldfine | |

* cited by examiner

*Primary Examiner*—Safet Metjahic
*Assistant Examiner*—Trung Q. Nguyen
(74) *Attorney, Agent, or Firm*—David McEwing; Alton Payne

(57) ABSTRACT

A method is provided for creating a spectral EM frequency to calculate the thickness of a material with unknown permeability and conductivity using metallic transparencies. The method comprises the steps of testing empirically to approximate the conductivity, testing empirically to approximate the permeability, creating a first set of electromagnetic waves adjacent to the material to be measured of a relatively low frequency, impinging the first set of electromagnetic waves on the material for saturating the material, creating a second set of electromagnetic waves having specific constant amplitude of a higher frequency than the first set of electromagnetic waves, the second set of electromagnetic waves for engaging the material and generating a sensing signal having modified characteristics, and receiving the sensing signal through the saturated material such that the modified characteristics of the sensing signal are processed to determine the thickness of the material.

6 Claims, 13 Drawing Sheets

SPECTRAL EM FREQUENCY METALLIC THICKNESS MEASUREMENT USING METALLIC TRANSPARENCIES

CROSS REFERENCE TO RELATED APPLICATION

The present application is a continuation-in-part application of the pending application of Bijan Amini, U.S. Ser. No. 09/332,202, filed Jun. 12, 1999, entitled PROPAGATION OF WAVES THROUGH MATERIALS, pending which claims benefit of U.S. Provisional App. No. 60/088,955, filed Jun. 11, 1998. The present application also claims benefit of U.S. Provisional Application No. 60/166,696, filed Nov. 20, 1999, entitled SPECTRAL EM FREQUENCY METALLIC THICKNESS MEASUREMENT USING METALLIC TRANSPARENCIES, U.S. Provisional Application No. 60/166,695, filed Nov. 20, 1999, entitled APPARATUS FOR MAGNETIC SATURATION AND COUPLING, and U.S. Provisional Application No. 60/166,693, filed Nov. 20, 1999, and entitled MAGNETIC LENSING™.

FIELD OF THE INVENTION

The present invention relates generally to utilizing controlled transmissions of electromagnetic (EM) energy through or across materials that have previously been barriers to their penetration to determine the thickness and EM characteristics of ferromagnetic materials.

BACKGROUND OF THE INVENTION

It has long been possible to measure metallic thickness variations by electromagnetics. Prior methods have typically excited the metal by eddy currents or D.C. fields. After excitation, the known methods looked for variations in amplitude of the signal corresponding to variations in metallic thickness.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features, and advantages and in accordance with the purpose of the invention as embodied and broadly described herein, a method is provided for creating a spectral EM frequency to calculate the thickness of a material with unknown permeability and conductivity using metallic transparencies. The method comprises the steps of (a) testing empirically to approximate the conductivity, (b) testing empirically to approximate the permeability, (c) creating a first set of electromagnetic waves adjacent to the material to be measured of a relatively low frequency, (d) impinging the first set of electromagnetic waves on the material for saturating the material, (e) creating a second set of electromagnetic waves having specific constant amplitude of a higher frequency than the first set of electromagnetic waves, the second set of electromagnetic waves for engaging the material and generating a sensing signal having modified characteristics, and (f) receiving the sensing signal through the saturated material such that the modified characteristics of the sensing signal are processed to determine the thickness of the material.

In another embodiment, a method for creating a spectral EM frequency to calculate the thickness of a material having a constant length L and varying frequencies with unknown permeability and conductivity is provided. The method comprising the steps of (a) calculating the penetration depth $\delta$ using $$\delta = \left(\frac{1}{e}\right) L$$

and $$\delta = \frac{1}{\sqrt{\sigma \mu_r \mu_o f}}$$

where
- $\delta$ = penetration depth,
- $f$ = frequency,
- $\mu_r$ = relative permeability, and
- $\mu_o$ = absolute permeability, (b) determining the relationship of frequencies such that $f_6 > f_5 > f_4 > f_3 > f_2 > f_1$, and (c) using the frequencies to determine the thickness of the material.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention.

Figure 1:
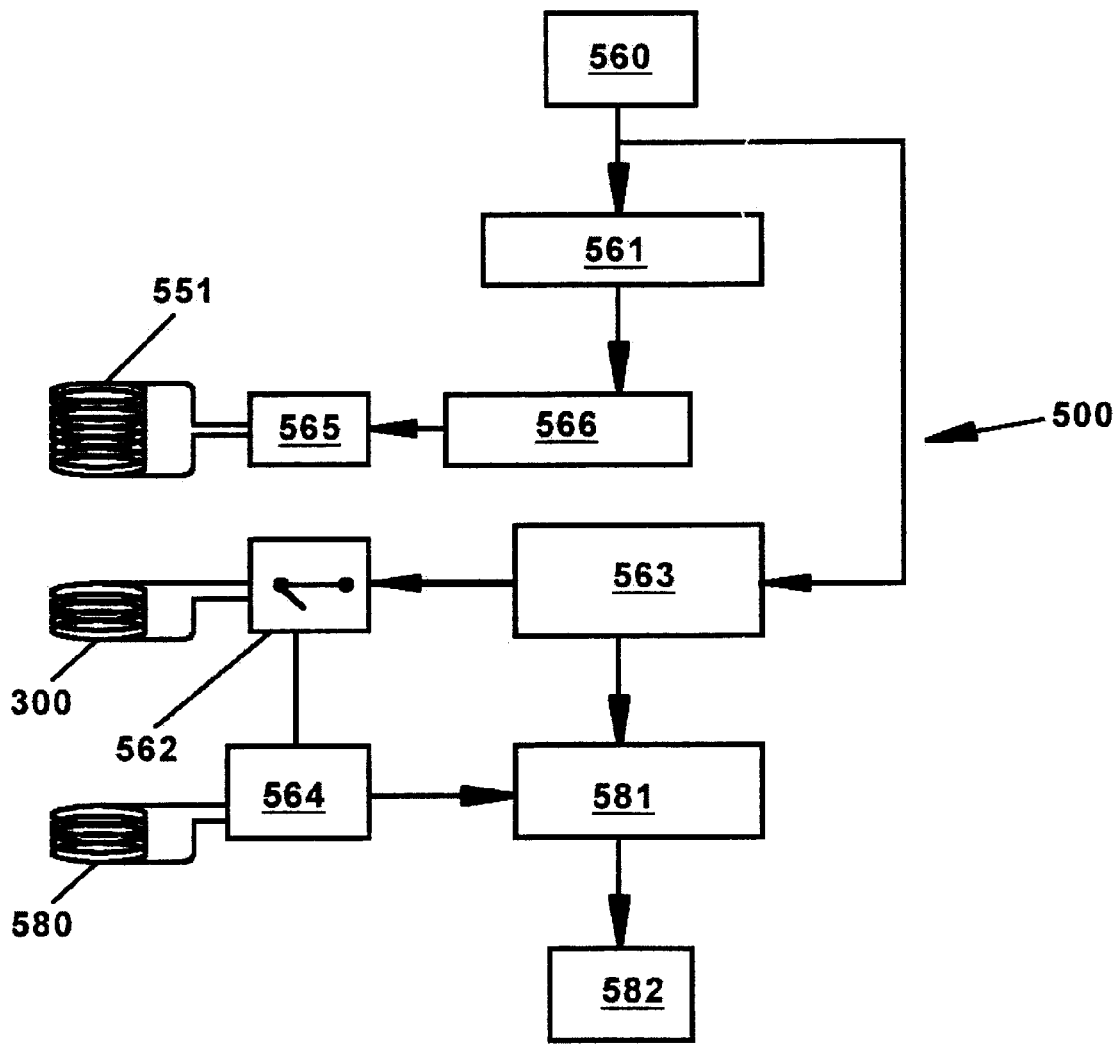
FIG. 1 is a block diagram of one embodiment of a magnetic transparency generator of the present invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

It is possible to greatly improve existing methods of measuring electrical conductivity by using a spectrum of frequencies rather than one frequency. In addition, the metallic permeability must be measured to accurately depict the effects of the metallic barrier or measuring through the barrier. Using a range of frequencies allows a single device to function where metallic thickness may vary from zero (no metal) to inches thick. Using the same frequency over such a wide range causes a large loss of resolution and accuracy. Therefore, for a given range of material thicknesses, a particular group of frequencies will provide improved resolution and better accuracy. To eliminate the effects of a varying metallic permeability, it is necessary to create a local metallic transparency with the permeability as close to unity as possible while the frequency is being varied. Then, while the frequency is held constant, changing the amount of the transparency varies the permeability. Changing the amount of the transparency is accomplished by varying the saturation current as discussed below.

One embodiment of the present invention as embodied and broadly described herein is a method for creating a spectral EM frequency metallic thickness measurement using metallic transparencies. In order to calculate the thickness of a material with unknown permeability and conductivity, empirical testing is used to first approximate the conductivity and permeability. Conductivity and permeability can be approximated in any order using techniques herein discussed.

The first step to calculate the thickness of a material is to create a first set of electromagnetic waves adjacent to or near the material to be measured. The first set of waves may be generated by a permanent magnet, an electromagnet powered by DC current or AC current. The AC powered EM waves will preferably be of a relatively low frequency. The first waves fully saturate the barrier material with the magnetic component. A second set of electromagnetic waves is generated with specific constant amplitude and is monitored using a receiver. The receiver is located adjacent to or near the material to be measured and maybe a distance from the transmitter or alternately co-located with the transmitter. The transmitter frequency is increased incrementally while the amplitude is held constant and the received signal is monitored. As required by skin depth theory, for a given wave of constant amplitude and varying frequency, the lower frequencies penetrate deeper into a piece of metal than the higher frequencies. The higher the frequency the more loss of signal, or the more attenuation occurs. See FIG. 3. Therefore, a transmitted wave of single frequency can be generated, then incrementally increased, for example by stepping, while monitoring the received frequency. See FIG. 4D. The received frequency will attenuate each time the transmitted signal increases. Once the received signal is not detectable by the receiver, the maximum frequency penetrating the entire thickness is determined. The last frequency to generate a received signal is the maximum penetration frequency. See FIG. 4D. The maximum penetration frequency is used in the present invention to determine material thickness.

The second step in calculating the thickness of a material with unknown permeability and conductivity is the approximation of permeability. Using the same transmitter, receiver, and saturation procedures described in the first step, a saturation wave is generated near or close to the barrier material to be measured. The saturation wave has a known yet variable current. A transmitter wave of known and constant frequency and amplitude is generated at or near the barrier material within a zone to be effected by the saturation current. A receiver monitors the results of the transmitted signal returning for generating a resulting electromagnetic response. While monitoring the received response and holding the transmitted wave frequency and amplitude constant, the saturation current is increased incrementally. Thus, the received signal will generally mirror the steps of the saturation current steps but at different amplitudes than the transmitted signal. As the saturation current increases, the barrier material becomes more and more transparent to a wave of constant transmitted signal amplitude, thus, allowing for an increased received signal proportional to the increases in saturation current. The saturation current is increased and the received signal is monitored while again holding the transmitted signal constant until the received signal registers no change. The point at which the received signal registers no change is called total saturation. See FIG. 4E. Once total saturation occurs additional saturation current has no affect on the received signal. Thus, the transmitted signal is coupled with the metal and the metal is now transparent to the transmitted signal. The current history and the associated received signal, as illustrated in FIGS. 4C, 4D and 4E, provide for full or partial saturation of a localized area. Further, the current history and the received signal information can be used to mathematically determine the permeability and thickness. Once approximations are obtained on either permeability and conductivity, the material thickness calculations can be made.

The technique of the present invention for calculating the thickness of a material with unknown permeability and conductivity can be used to further classify various materials and thicknesses such that a general lookup table can be created. The general lookup table can contain known results from numerous test samples allowing for quick lookup and display of thicknesses based on known samples meeting the test criteria. The test criteria can be for a range of thicknesses for specified materials having the same permeability and conductivity.

It order to obtain an accurate measurement of permeability and/or conductivity, electronic and geometric nulling are required. Geometric nulling positions the transmitter, receiver and saturation coils in the optimum locations for the particular system designed. Various designs are provided yielding excellent results. Also, an electronic nulling circuit can simultaneously null all of the frequencies at once.

Pursuant to practicing the present invention as described herein, one skilled in the art will know and appreciate how to arrange the transmitter, receiver and saturation coils in optimum locations for the particular system being used, and will know and appreciate how to simultaneously null all of the frequencies at once to provide electronic nulling.

FIG. 1 is a block diagram of one embodiment of a magnetic transparency generator 500 of the present invention. The magnetic transparency generator 500 comprises a large coil 551, a small coil 300, and a recervier coil 580. The large coil 551 generates the transparency current. The small coil 300 generates the transmitter signal. The recervier coil 580 accepts the returning transmitter signal. The large coil 551 for generating the transparency current is engaged with a pulser 566, one or more capacitors 561 and a power source 560. The small coil 300 of the transmitter and the receiver coil 580 are engaged with a switch 562, a frequency generator 563, a low noise amplifier (LNA) 564, an electrical nulling circuit 581 for digital signal processing and an output means 582.

Figure 2:
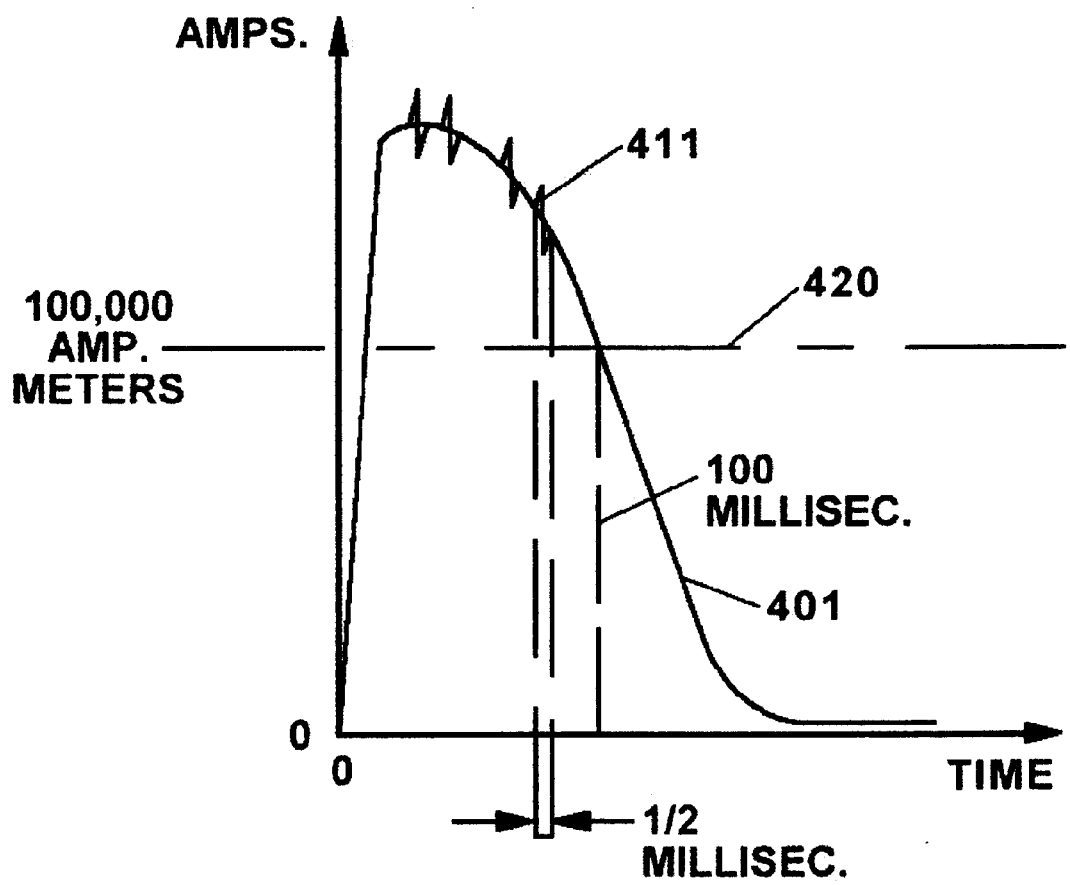
FIG. 2 illustrates a graph of current versus time with respect to the present invention.

FIG. 2 illustrates a graph of current versus time with respect to the present invention. FIG. 2 illustrates three significant features in practicing the present invention: the current level required for saturation 420, the higher frequency sensing signal 411 and the lower frequency transparency signal 401. The higher frequency sensing signal 411 is imposed on the lower frequency transparency signal 401. FIG. 2 illustrates as spikes 411 the higher frequency oscillating electromagnetic wave of the sensing signal 411 disposed along a lower frequency oscillating transparency current 401. In one embodiment of the present invention, the sensing signal 411 may be transmitted only during the duration of each cycle of the oscillating transparency current 401 that is above the level 420 required for saturation. Among other advantages, the latter embodiment minimizes energy consumption. In the latter embodiment, it is possible to have multiple sensing signal transmissions 411 during each phase that the transparency current 401 is above the saturation level 420.

The transparency current 401 may not achieve the level of current necessary to saturate the targeted area of the EM barrier material. However, the distinctively higher frequency sensing signals 411 will couple, i.e., penetrate, into the EM barrier or, alternatively, be of sufficient magnitude to saturate a volume region of transparency or partial transparency when combined with the transparency current, and therefore, directly penetrate through the barrier material. In another embodiment, the transparency current may be generated from at least one permanent magnet, a low frequency AC current or a direct current DC electromagnetic device.

Illustrated schematicly as an apparatus in FIG. 1 and conceptually in FIG. 2, the higher frequency sensing signal 411 may be generated by a transmitter, comprised of a smaller coil 300 of conductive material, powered by alternating current and at a controlled frequency, wrapped upon or near the larger coil 551. The larger coil 551 generates the transparency current which in turn generates the transparency field. It is wrapped with conductive material and powered either by DC current or an oscillating current. Preferably, the transmitter current is at a higher frequency than the transparency current. It is preferred that the frequency of the sensing signal be at least a multiple of 10 greater than the frequency of the transparency signal. As discussed above, the higher sensing frequency allows, for example, 10 wavelengths of measurement before the transparency is closed.

In FIG. 2, the high frequency sensing signal 411 is illustrated being pulsed at less than 0.5 millisecond rates. If the lower frequency transparency current 401 generated by the larger coil 551, is pulsed or activated "on" for 10 milliseconds 430, there is sufficient time for twenty sensing signals (e.g., with a wavelength of only 0.5 millisecond) to go out to a near object and take 10 wavelengths of measurements during the "on" pulse of the transparency current. During this 10 millisecond pulse, the transparency current will exceed the saturation energy level 420. The higher frequency signal 411 from the transmitter coil 300 is being pulsed at a 0.5 millisecond rate so that 20 sensing signals will be available during a 10 millisecond pulse of the transparency signal 401.

For most applications, a power source of 300 watts or less is sufficient to create the signal and saturation. For thicker material, strong pulses and signals may be generated by utilizing the charge storing capacitors 561. The capacitors 561 are slowly charged then quickly discharged through a switch contact and then through the low impedance large coil 551. At the same time, the higher frequency small signal coil 300 is pulsed.

Figure 3:
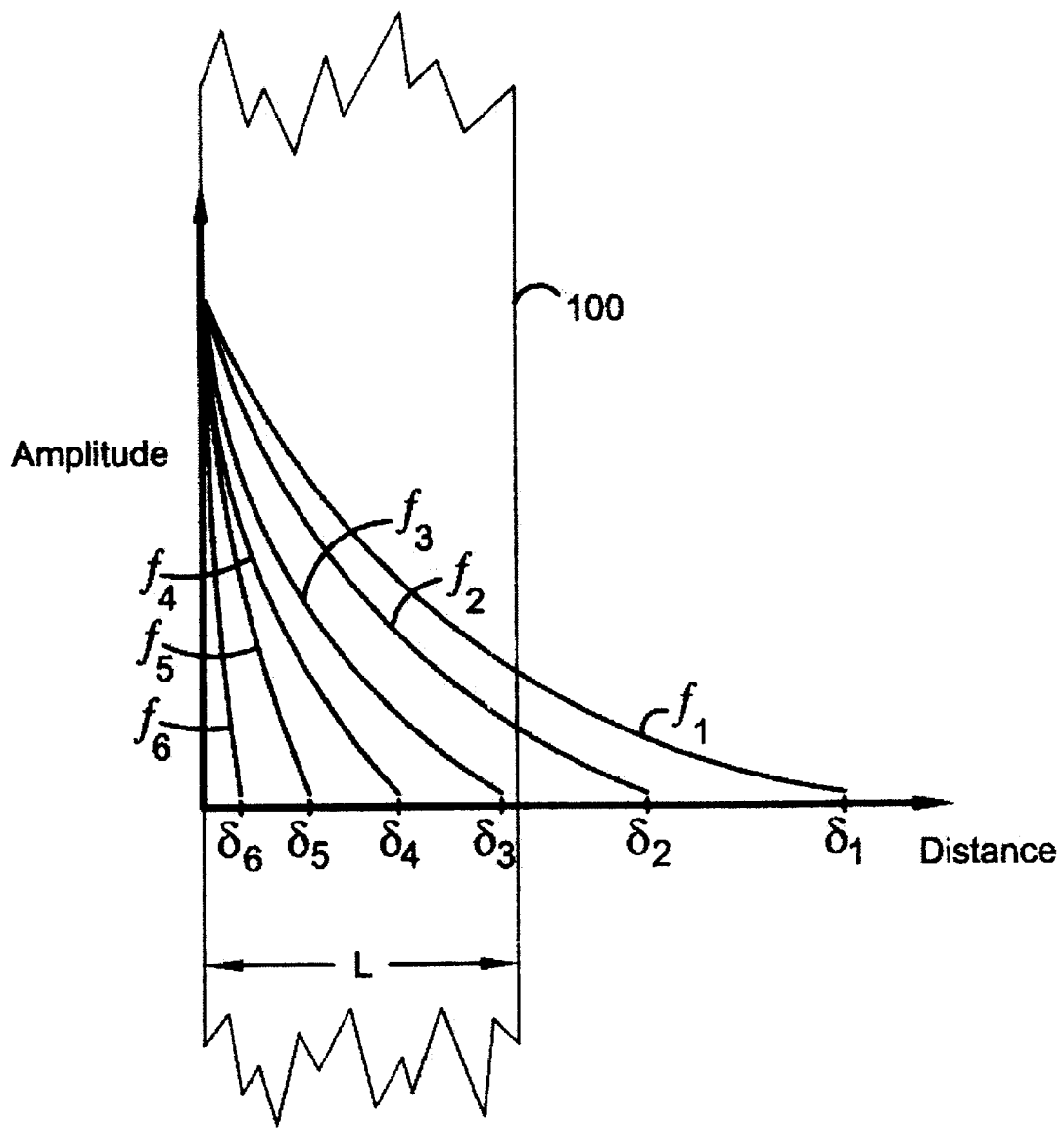
FIG. 3 illustrates the relationship between signal frequency and penetration depth for a cross-section of a piece of metal with a conductivity, a permeability and several imposed frequencies, $f_x$, for the present invention.

FIG. 3 illustrates the relationship between signal frequency and penetration depth for a cross-section of a piece of metal with a conductivity, a permeability and several imposed frequencies, $f_x$, for the present invention. For a wave of constant amplitude and varying frequency, and a metal with the same permeability and conductivity, it is known by skin depth theory that a lower frequency penetrates deeper than a higher frequency. Therefore, one can find an optimum frequency range that can characterize the metal conductivity. For constant length L and varying frequencies, the penetration depth $\delta$ is:

$$\delta = \left(\frac{1}{e}\right)L$$

and $$\delta = \frac{1}{\sqrt{\sigma \mu_r \mu_o f}}$$

where
 $\delta$=penetration depth,
 $f$=frequency,
 $\mu_r$=relative permeability, and
 $\mu_o$=absolute permeability.
In FIG. 3, the relationship of frequencies is
 $f_6, f_5, f_4 > f_3 > f_2 > f_1$.

Figure 4:
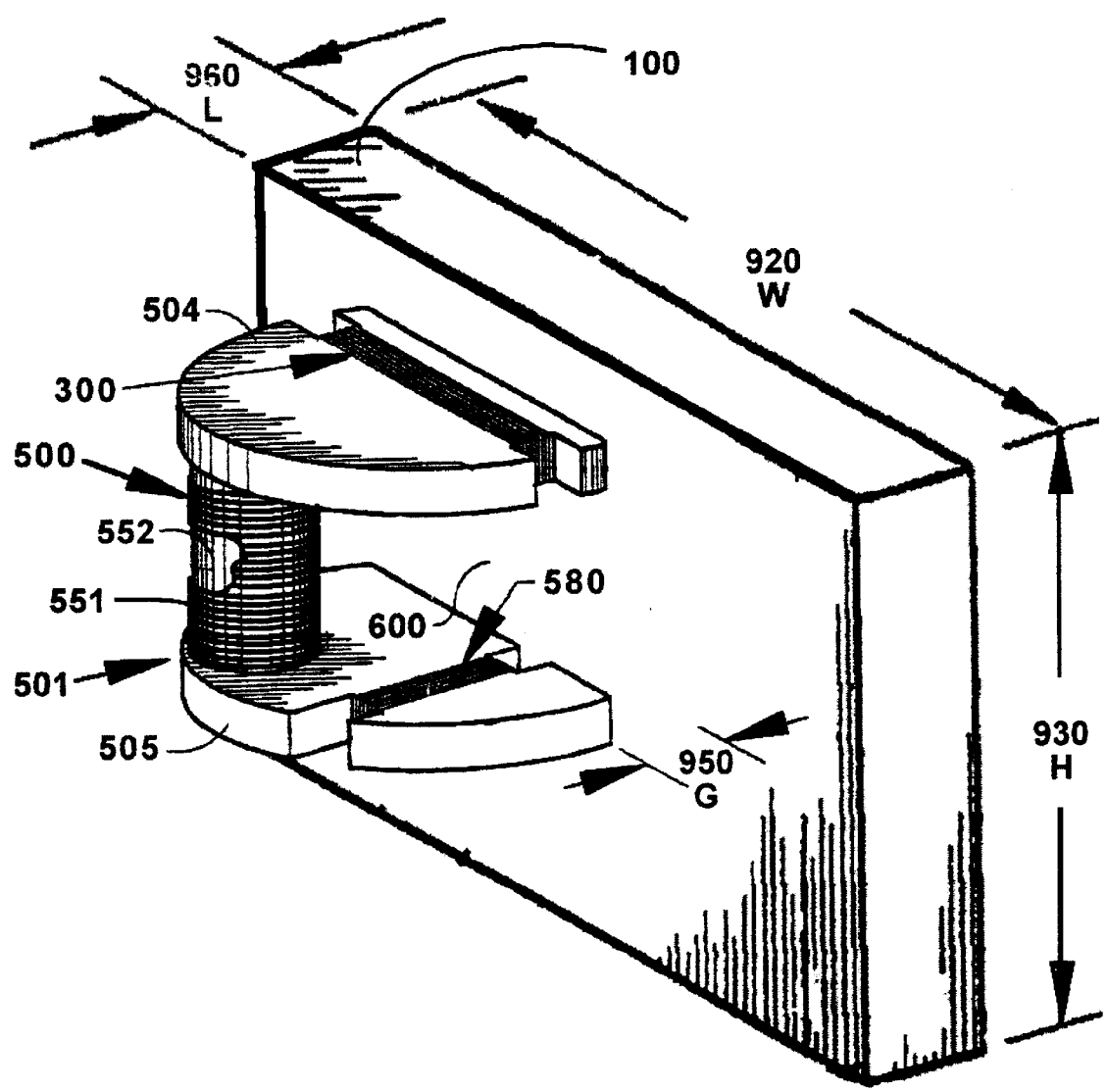
FIG. 4 illustrates the flux circuit core of one embodiment of the magnetic transparency generator used to generate the transparency current required in practicing the present invention.

FIG. 4 illustrates one embodiment of a magnetic transparency generator 500 used to generate the transparency current required in practicing the present invention. The magnetic transparency generator 500 provides for containing flux lines to completely saturate the intended barrier material 100 volume region. Also, FIG. 4 illustrates one embodiment of the flux circuit core 501 for use with the present invention. The flux circuit core 501 comprises a top flange 504, a bottom flange 505 and a core 552. The core 552, upon which the coils of the electromagnet are wrapped, is located between the top flange 504 and bottom flange 505. The tank wall comprises the barrier material 100. The complete magnetic transparency generator 500 incorporates the flux circuit core 501 for providing a transparent volume region that is illustrated having a width W 920, a height H 930 and a thickness L 960. The barrier volume region may be termed the target material. It is appreciated that the transmitter coils 300, the receiver coils 580 and the transparency coil 551 are in positions of geometric nulling with respect to the magnetic transparency generator 500 illustrated.

Figure 4A:
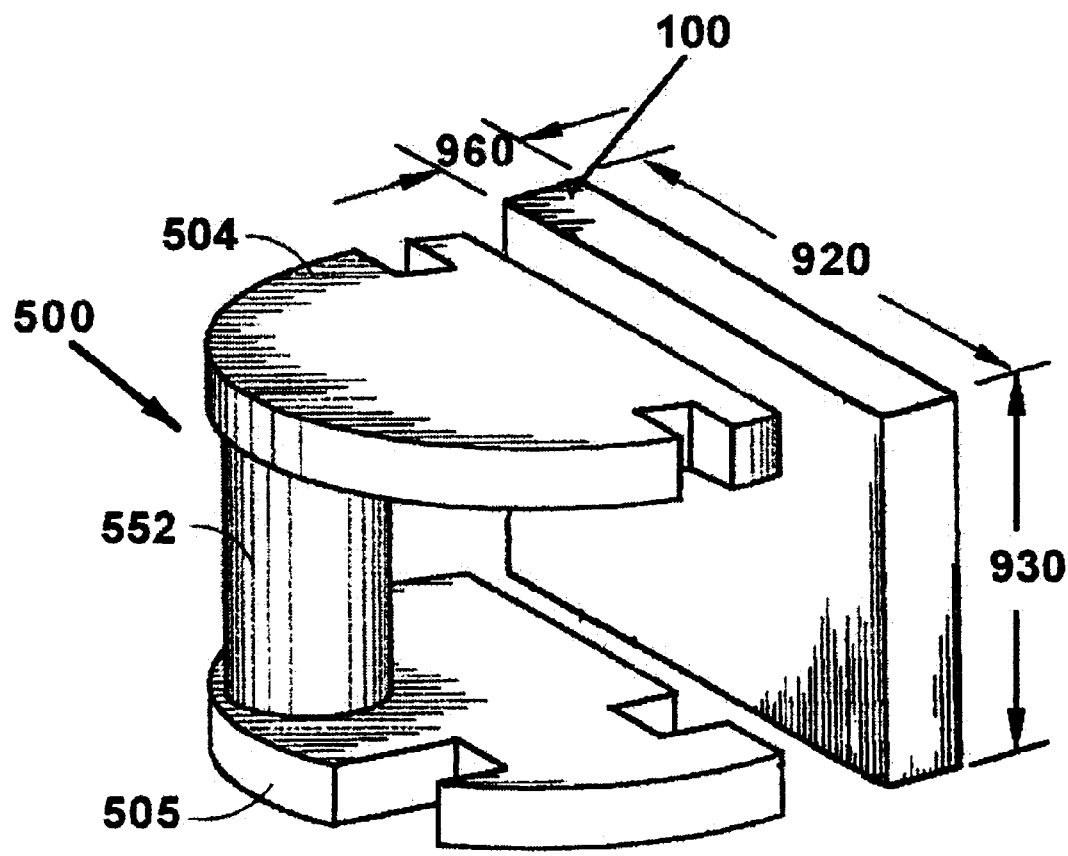
FIG. 4A illustrates one embodiment of a flux circuit core for use with the present invention.

FIG. 4A illustrates one embodiment of the flux circuit core 501 for use with the present invention. The flux circuit core 501 comprises a top flange 504, a bottom flange 505 and a core 552.

Figure 4B:
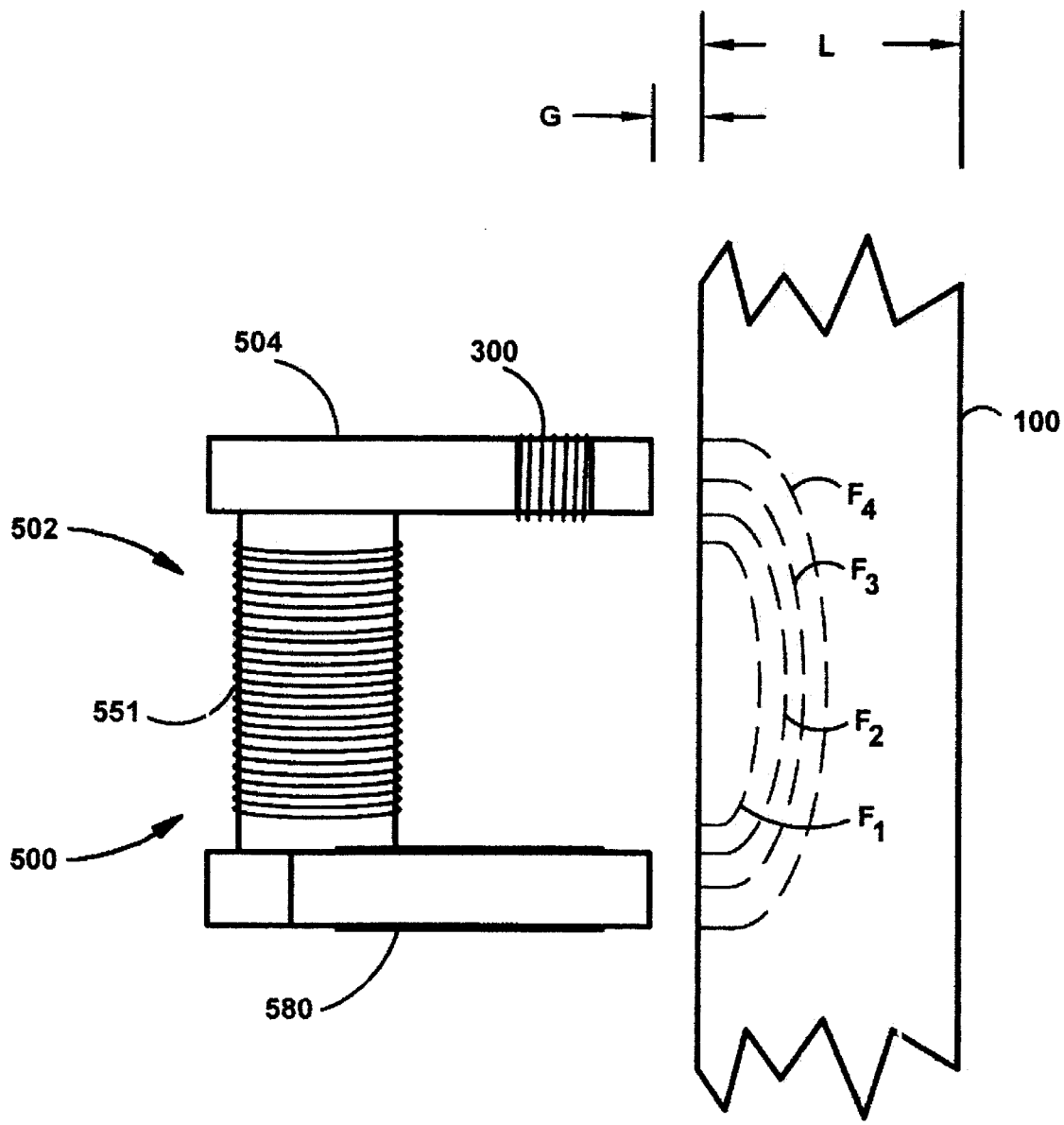
FIG. 4B illustrates one embodiment of a magnetic circuit for use with the present invention.
Figure 4C:
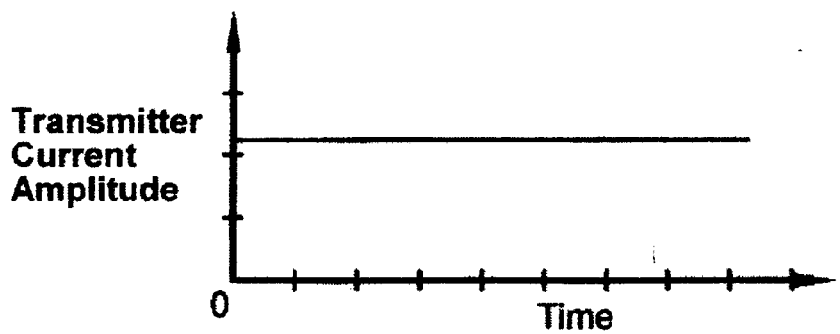
FIGS. 4C, 4D and 4E illustrate the relationship between the transmitter current amplitude (FIG. 4C), the saturation current amplitude (FIG. 4D), and the receiver current amplitude (FIG. 4D) with respect to the magnetic circuit illustrated in FIG. 4B.
Figure 4D:
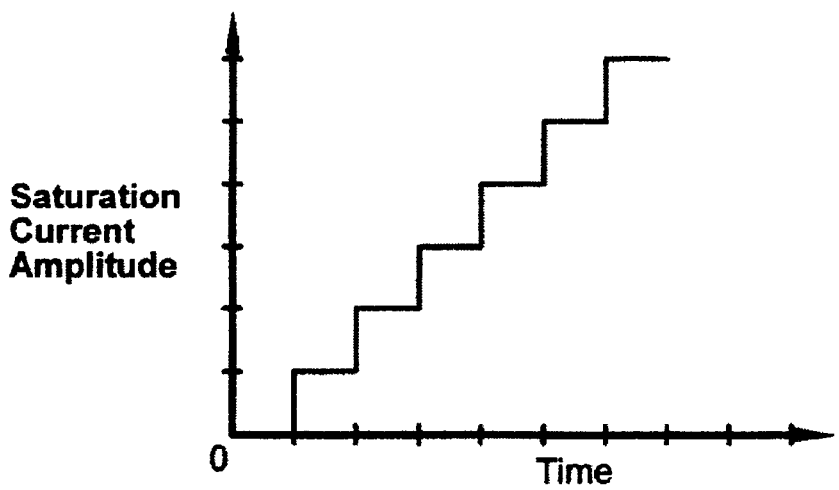
Figure 4E:
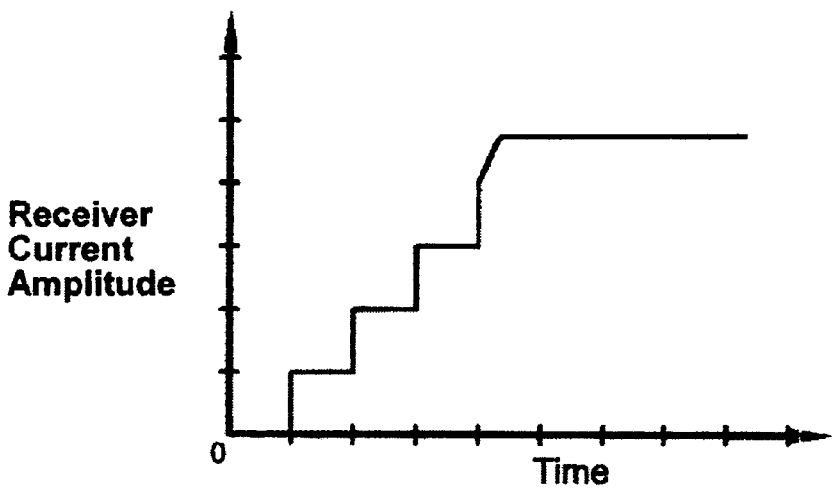

FIG. 4B illustrates one embodiment of the magnetic circuit 502 for use with the present invention. The magnetic circuit 502 comprises the saturation coil 551, the transmitter coil 300, the receiver coil 580 and the barrier material 100. The magnetic transparency generator 500 is disposed from the barrier material 100 by a gap G. The barrier material 100 has a width L. The magnetic circuit 502 operates by energizing the saturation coil 551 for saturating the barrier material 100, transmitting a sensing signal from the transmitter coil 300, and receiving a response via the receiving coil 580. The relative penetration is caused by the change in the saturation current. Thus, as the saturation current increases from $i_1$, to $i_2$, to $i_3$, to $i_4$ then the penetration depth increases from $\delta_1$, to $\delta_2$, to $\delta_3$, to $\delta_4$, respectively. FIG. 4B illustrates the incremental increase in penetration by the field lines $F_1$, $F_2$, $F_3$ and $F_4$. Also, consideration of the cross-sectional area of each component of the magnetic circuit 502 is required to assure that no component goes into total saturation for a specific power requirement necessary to drive the EM wave across the air gap G.

FIGS. 4C, 4D and 4E illustrate the relationship between the transmitter current amplitude, the saturation current amplitude, and the receiver current amplitude with respect to the magnetic circuit 502 illustrated in FIG. 4B. FIG. 4C illustrates that the transmitter current amplitude maybe constant over time. FIG. 4C shows that the saturation current amplitude is increased as a step function over time. With the transmitter current amplitude held constant over time and the saturation current amplitude increased as a step function over time, the receiver current amplitude will increase as a step function congruent with the saturation current amplitude up to and until the barrier material is in a state of total saturation. When the barrier material is in a state of total saturation, the receiver current amplitude is at a maximum and cannot increase because maximum penetration has been achieved.

Figure 5:
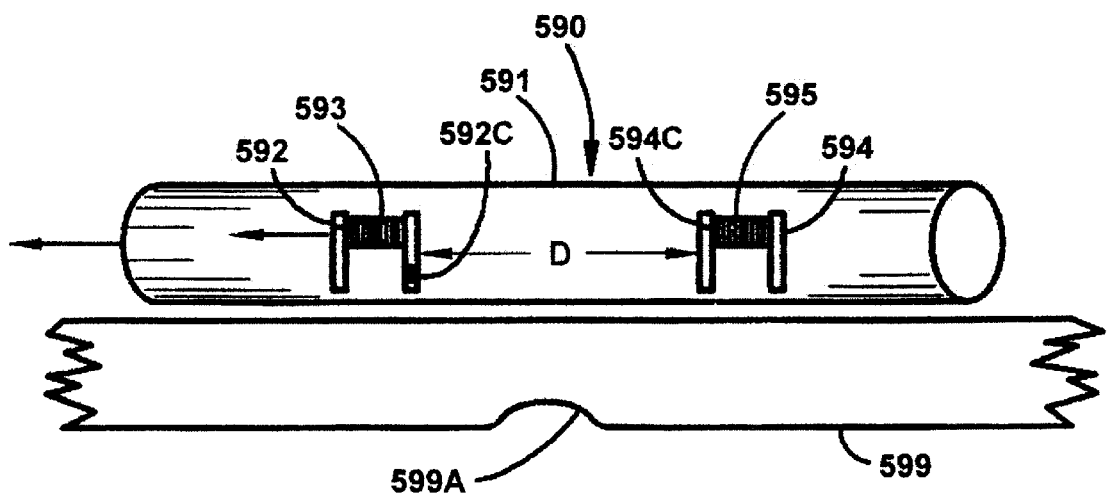
FIG. 5 illustrates one embodiment of a bistatic magnetic transparency generator of the present invention.

FIG. 5 illustrates one embodiment of a bistatic magnetic transparency generator 590 of the present invention. Using the bistatic magnetic transparency generator 590 shown in FIG. 5, the permeability is driven to unity. Electromagnetic waves are transmitted by the transmitter 592 at different frequencies and monitored with the receiver 594. A metallic transparency is created by generating a saturation of the barrier material 599. An electromagnetic wave is generated using the transmitter 592 at a preset frequency and constant amplitude. Assuming the first frequency is within the detectable frequency range, the frequency is increased incrementally until the received signal is lost. See FIGS. 4C–E. The last frequency detected prior to losing the received signal determines the maximum frequency detectable in a certain piece of barrier material 599 of constant thickness, permeability, and conductivity. See FIG. 4E. Using the data and information received in empirical testing for permeability, the material properties and thickness can be very precisely calculated.

In FIG. 5, the bistatic magnetic transparency generator 590 comprises a housing 591, a transmitter 592 and a receiver 594. The transmitter 592 and the receiver 594 are displaced by a distance D. The transmitter 592 includes a transmitter coil 592C and a saturation magnet 593. The receiver 594 includes a receiver coil 594C and a saturation magnet 595. The bistatic magnetic transparency generator 590 is in operative association with a barrier material 599 having a defect 599D. It can be appreciated by those skilled in the art that in the bistatic configuration illustrated in FIG. 5 the distance D must be sufficiently small to detect the defect 599A. Such that the accuracy is limited by the mass to be evaluated and the displacement distance D.

Figure 6:
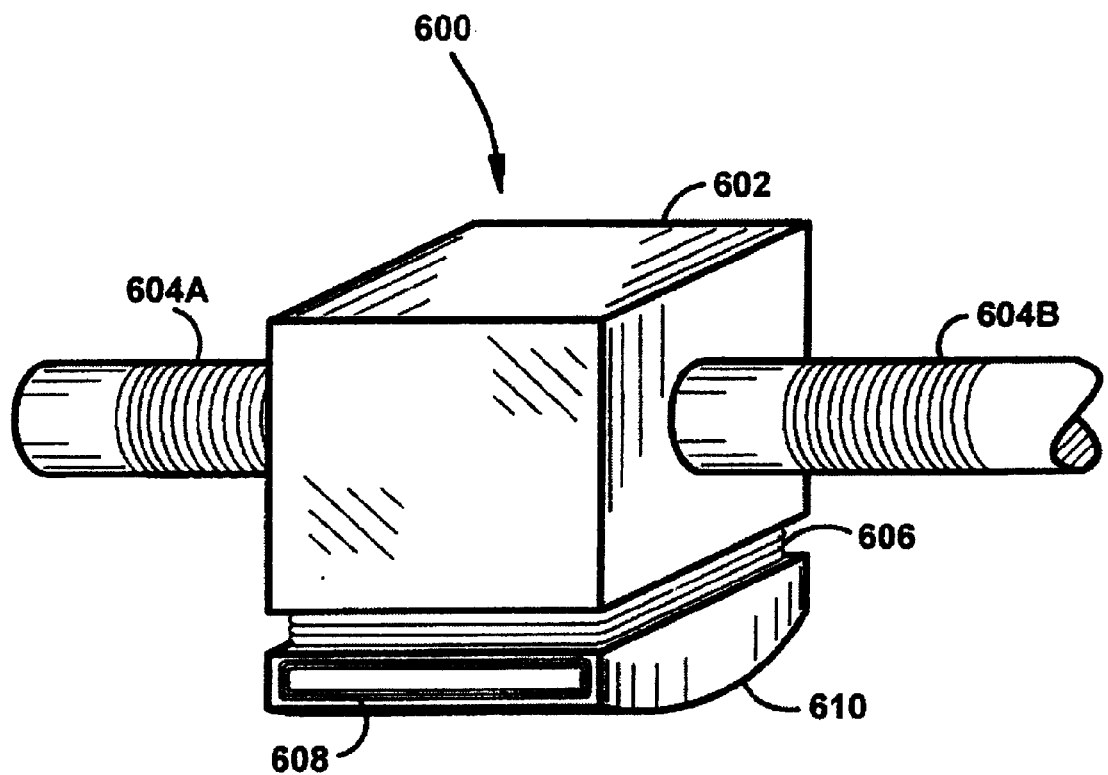
FIG. 6 illustrates one embodiment of a magnetic transparency generator of the present invention in operative association with a culminator.

FIG. 6 illustrates one embodiment of a magnetic transparency generator 600 of the present invention in operative association with a culminator 602. The transmitter 606 and the receiver 608 are both on the same culminator 602. The displacement distance D between the transmitter 606 and the receiver 608 is essentially zero. The displacement distance D is essentially zero because of the close configuration of the transmitter 606 and the receiver 608. The intensity of the frequencies received will show the metal thickness. For example, if all the higher frequencies are attenuated, the metal is thick. If all the high frequencies are detected with little attenuation of the low frequencies, the metal is thin. For a given power, the displacement distance D between the transmitter 606 and the receiver 608 determines the resolution of the thickness measurement. The resolution effects the size of the defect measurable.

Figure 7:
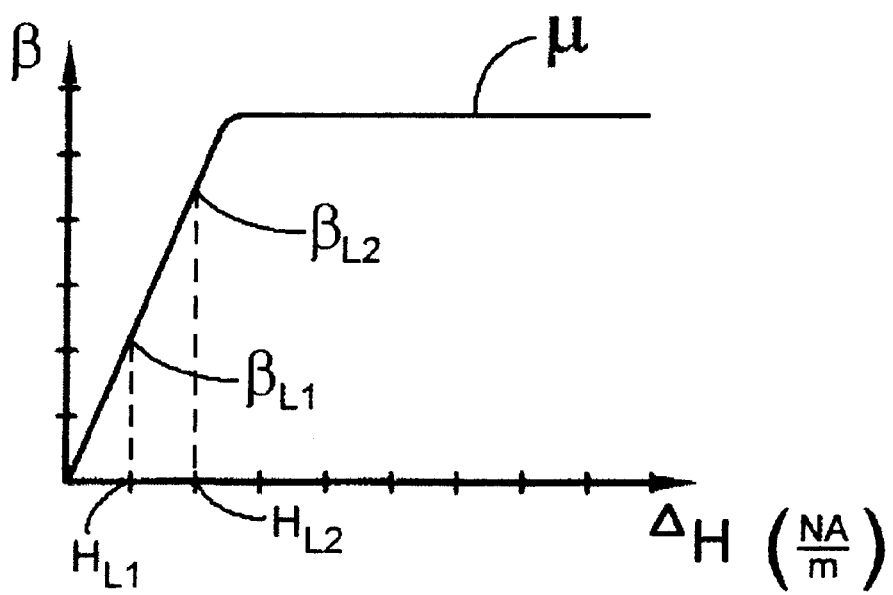
FIG. 7 illustrates the relationship between the flux field $\beta$ and the change in H ($\Delta$H) in turns-amp/meters.

FIG. 7 illustrates the relationship between the flux field $\beta$ and the change in H ($\Delta H$) in turns-amp/meters. The permeability $\mu$ is plotted. For the relationship between the flux field $\beta$ and $\Delta H$, the function defining the permeability $\mu$ remains the same. Although the function defining the permeability $\mu$ remains the same the value of $\Delta H$ for thinner materials moves up the curve faster. Thus, incremental changes in H create a faster advancement up the permeability curve toward saturation. For example, a given $H_{L1}$ corresponds to the value of $\beta_{L1}$ and a corresponding $H_{L2}$ corresponds to the value of $\beta_{L2}$. Thus, the value for L2 moves faster up the permeability $\mu$ curve than the value for L1.

Figure 8:
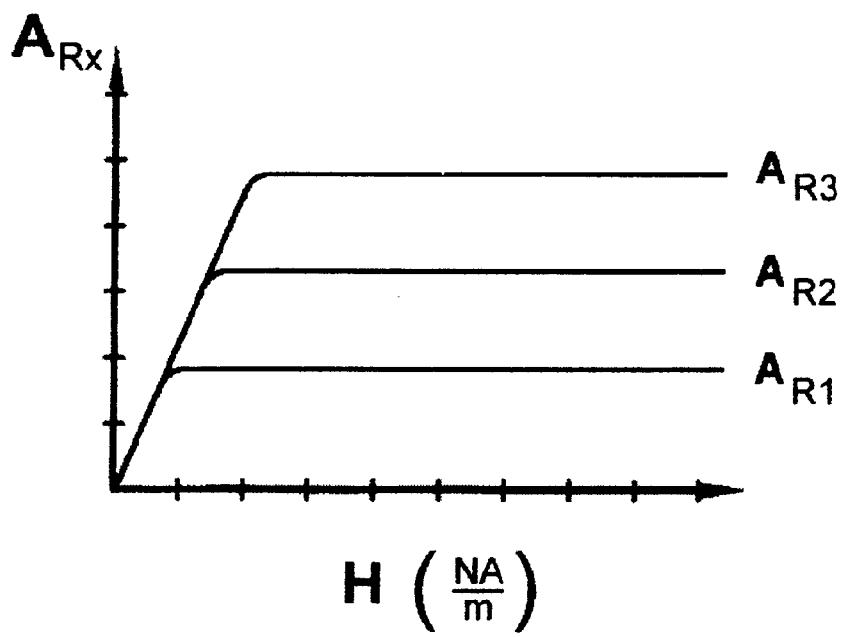
FIG. 8 illustrates the relationship between the receiver amplitude $A_{Rx}$ and H in turns-amp/meters.

FIG. 8 illustrates the relationship between the receiver amplitude $A_{Rx}$ and H in turns-amp/meters. As in FIG. 7, the slope of the curve in FIG. 8 is related to the permeability $\mu$. However, the receiver amplitude $A_{Rx}$ reaches a different maximum value depending on the thickness of the material. For thinner materials, the receiver amplitude $A_{Rx}$ reaches its maximum value at a lower amplitude $A_{Rx}$. For thicker materials, the receiver amplitude $A_{Rx}$ reaches its maximum value at a higher amplitude $A_{Rx}$. FIG. 8 illustrates a thinner material having a maximum at $A_{R1}$, a thicker material having a maximum at $A_{R3}$, and an intermediate thickness material having a maximum at $A_{R2}$.

Figure 9:
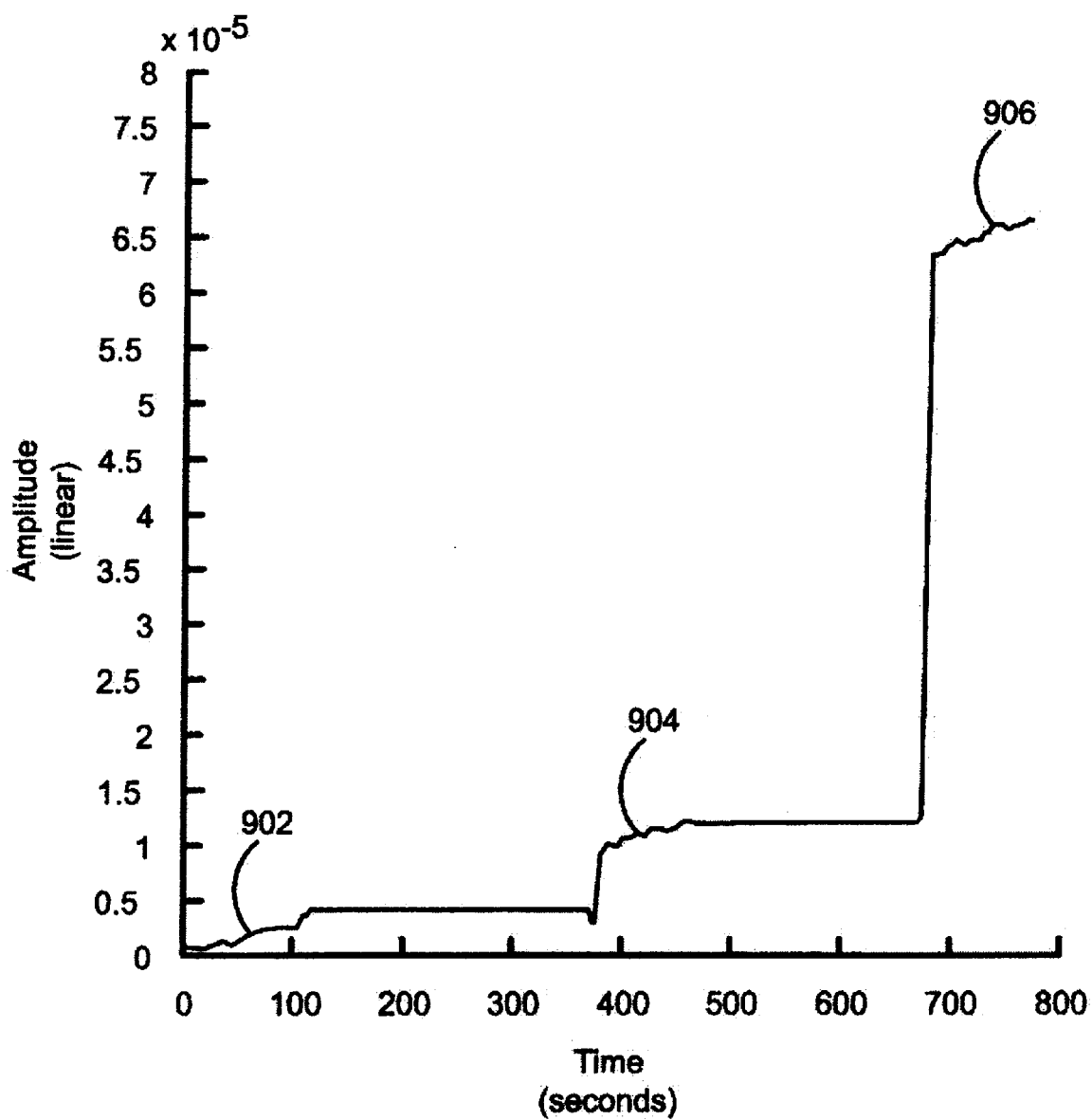
FIG. 9 is a graph of amplitude versus time for a bistatic configured magnetic transparency generator of the present invention.

FIG. 9 is a graph of amplitude versus time for a bistatic configured magnetic transparency generator of the present invention. The frequency is held constant (fixed) and the material is varied. The bistatic magnetic transparency generator was nulled using copper 902. Thereafter, the copper was replaced with brass causing the amplitude to vary from the original nulled position 904 to a new position 904. Since brass and copper have related properties, the dislocation 904 from the copper nulled position 902 is small. However, when the brass is replaced with aluminum the amplitude 906 varies significantly from the original nulled position 902. Aluminum and copper have significantly different physical characteristics.

Figure 10A:
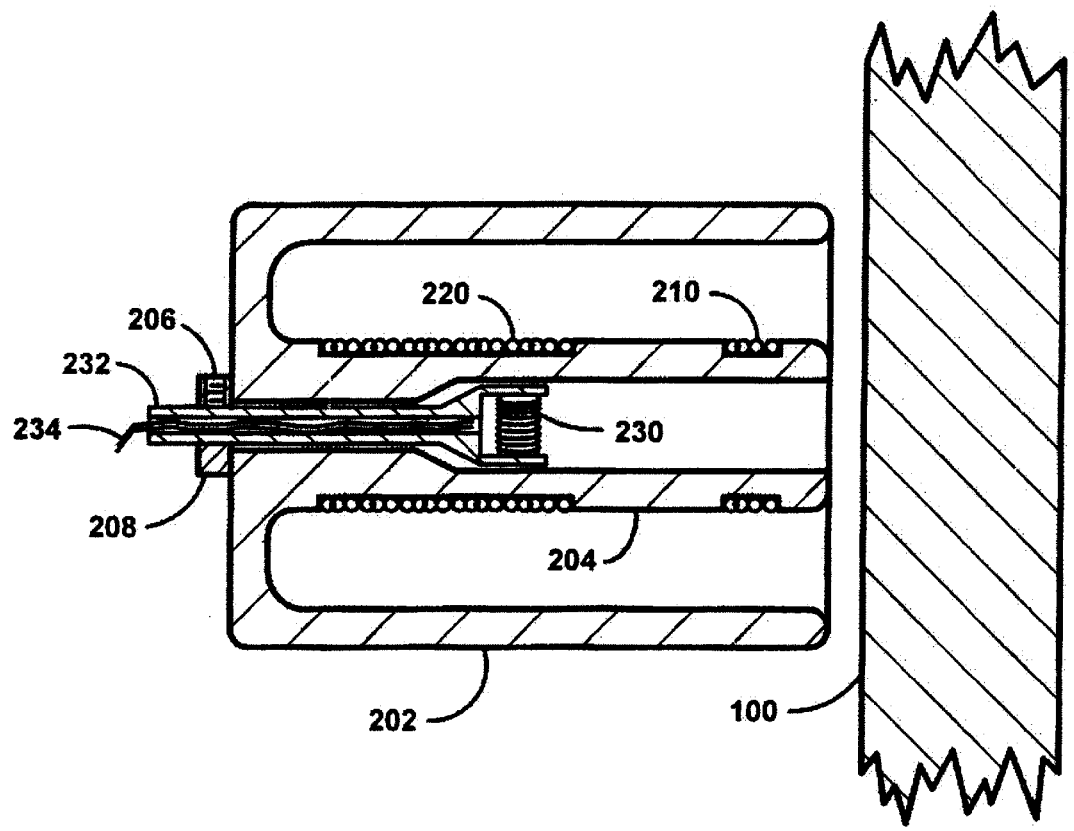
FIG. 10A illustrates an embodiment of a magnetic transparency generator used to generate a transparency with respect to a material for practicing the present invention as could be adapted in FIG. 10.
Figure 10:
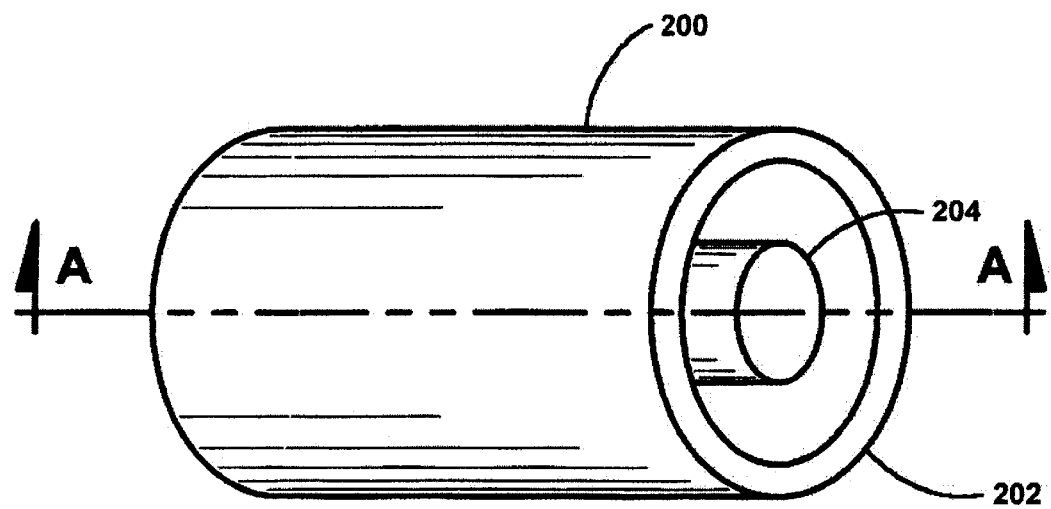
FIG. 10 illustrates another embodiment of a magnetic transparency generator used to generate a transparency in practicing the present invention.

FIG. 10 illustrates another embodiment of a magnetic transparency generator 200 used to generate a transparency in practicing the present invention. The magnetic transparency generator 200 comprises an outer cylindrical portion 202 and an inner cylindrical portion 204. The transmitter, receiver and saturation coils are disposed on, in or around the outer cylindrical portion 202 and the inner cylindrical portion 204.

FIG. 10A illustrates an embodiment of a magnetic transparency generator 200 used to generate a transparency with respect to a material 100 for practicing the present invention as could be adapted in FIG. 10. A transmitter coil 210 is disposed at the remote end of the of the outside diameter of the inner cylindrical portion 204 of the magnetic transparency generator 200. A saturation coil 220 is disposed at the inner end of the of the outside diameter of the inner cylindrical portion 204 of the magnetic transparency generator 200. A receiver coil 230 is disposed within the inside diameter of the inner cylindrical portion 204 of the magnetic transparency generator 200. The receiver coil 230 can be located at different positions using a shaft 232 which telescopes within the inside diameter of the inner cylindrical portion 204 of the magnetic transparency generator 200. The telescoping shaft 232 can also rotate using a set-screw adjustment 206 and a set-screw housing 208. Also, wiring 234 can be channelled through the shaft 232.

Figure 10B:
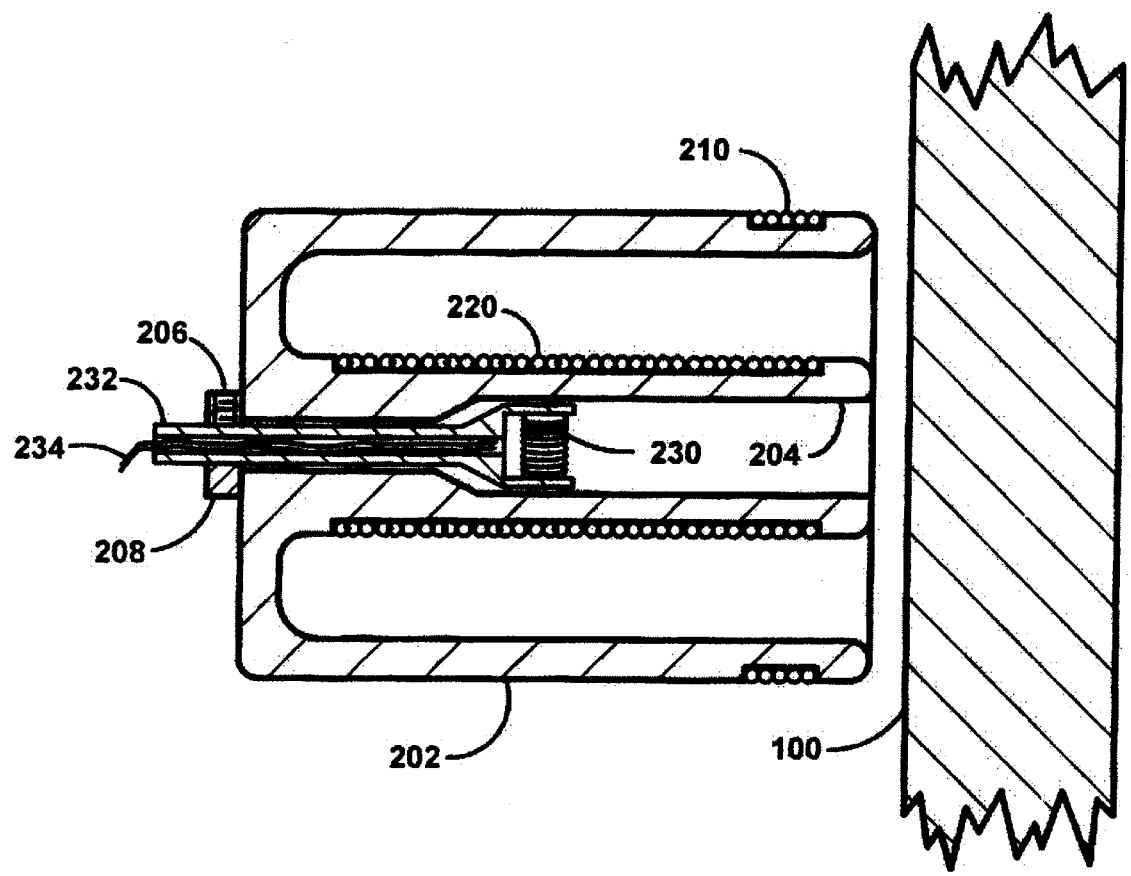
FIG. 10B illustrates another embodiment of a magnetic transparency generator used to generate a transparency with respect to a material for practicing the present invention as could be adapted in FIG. 10.

FIG. 10B illustrates another embodiment of a magnetic transparency generator 200 used to generate a transparency with respect to a material 100 for practicing the present invention as could be adapted in FIG. 10. A transmitter coil 210 is disposed at the remote end of the of the outside diameter of the outer cylindrical portion 202 of the magnetic transparency generator 200. A saturation coil 220 is disposed along the outside diameter of the inner cylindrical portion 204 of the magnetic transparency generator 200. A receiver coil 230 is disposed within the inside diameter of the inner cylindrical portion 204 of the magnetic transparency generator 200. The receiver coil 230 can be located at different positions using a shaft 232 which telescopes within the inside diameter of the inner cylindrical portion 204. The telescoping shaft 232 can also rotate using a set-screw adjustment 206 and a set-screw housing 208. Also, wiring 234 can be channelled through the shaft 232.

Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

What is claimed is:

1. A method for creating a spectral EM frequency to calculate the thickness of a material of unknown permeability and conductivity comprising the steps of:
    (a) calculating the penetration depth δ using $$\delta = \frac{1}{\sqrt{\sigma \mu_r \mu_o f}}$$

where
    δ=penetration depth,
    $f$=frequency,
    σ=conductivity,
    $\mu_r$=relative permeability, and
    $\mu_o$=absolute permeability.
    (b) impinging the material with at least one electromagnetic wave selected from a first set including constant and relatively low frequency waves and having constant amplitude,
    (c) impinging the material with at least one second electromagnetic wave of variable frequency and constant amplitude selected from a group having a minimum frequency higher than the first set and generating a sensing signal within the material,
    (d) varying the frequency of the second electromagnetic wave and monitoring the sensing signal,
    (e) determining the relationship of the frequencies such that $f_6 > f_5 > f_4 > f_3 > f_2 > f_1$, where $f_6$ is a higher frequency, $f_1$ is a lower frequency and one of the intermediate frequencies $f_5, f_4, f_3, f_2$, is a frequency of the second wave impinging the material when the sensing signal does not change with an increase in frequency and changes with a decrease in frequency,
    (f) impinging the material with at least one electromagnetic wave of known and variable current selected from a third group including constant and relatively low frequency waves,
    (g) impinging the material with a fourth electromagnetic wave of constant frequency and amplitude and generating a sensing signal,
    (h) measuring the current of the third set of waves when the sensing signal does not change with an increase in the current of the third wave and does change with a decrease in the current, and
    (i) using the measured amplitude, current and frequency of the electromagnetic waves to calculate the permeability and conductivity of the material and the penetration depth of the measured frequency where the penetration depth is related to the thickness of the material.

2. The method of claim 1 wherein the penetration depth of the measured frequency is equal to the thickness of the material.

3. A method for creating a spectral EM frequency to calculate the thickness of a material of unknown permeability and conductivity comprising the steps of:
    (a) impinging the material with at least one first electromagnetic wave of relatively low frequency having a constant amplitude,
    (b) impinging the material with at least one second electromagnetic wave of constant amplitude and adjustable higher frequency than the first electromagnetic wave and generating a sensing signal,
    (c) increasing the frequency of the second wave and monitoring the sensing signal;
    (d) measuring the frequency of the second wave when the sensing signal does not change with an increase in frequency and does change with a decrease in the frequency of the second wave;
    (e) impinging the material with one or more third constant low frequency electromagnetic wave of known and variable current,
    (f) impinging the material with a fourth electromagnetic wave of constant frequency and amplitude and monitoring the sensing signal generated by the fourth wave;
    (g) varying the current of the third wave,
    (h) measuring the current of the third wave when the sensing signal does not change with increases in the current of the third wave and changes with a decrease in the current, and
    (i) using the measured values of amplitude, current, and frequency of the electromagnetic waves, calculating the permeability and conductivity of the material and penetration depth of the measured frequency where the thickness of the material is related to the penetration depth.

4. The method of claim 3 wherein the depth of penetration of the measured frequency is equal to the thickness of the material.

5. The method of either claim 1 or 3 further comprising
    a. at least two additional values of frequency are measured and a curve plotted among measured values, b. at least two additional values of current are measured and a curve is plotted among measured values, and c. the curve of plotted frequency and the curve of plotted current are compared with corresponding curves of know material to identify the unknown material.

6. The method of claim 1 or 3 wherein the frequency is changed in equal uniform amounts, the frequency is measured when the magnitude of a corresponding change in the receiver signal is the greatest, the saturation current is changed in equal uniform amounts, and the saturation current value is measured when the corresponding change in receiver signal is the greatest.

* * * * *